Feb. 13, 1934.  A. G. CUSHING  1,946,486
VEHICLE BRAKE
Filed Nov. 26, 1932  2 Sheets-Sheet 1
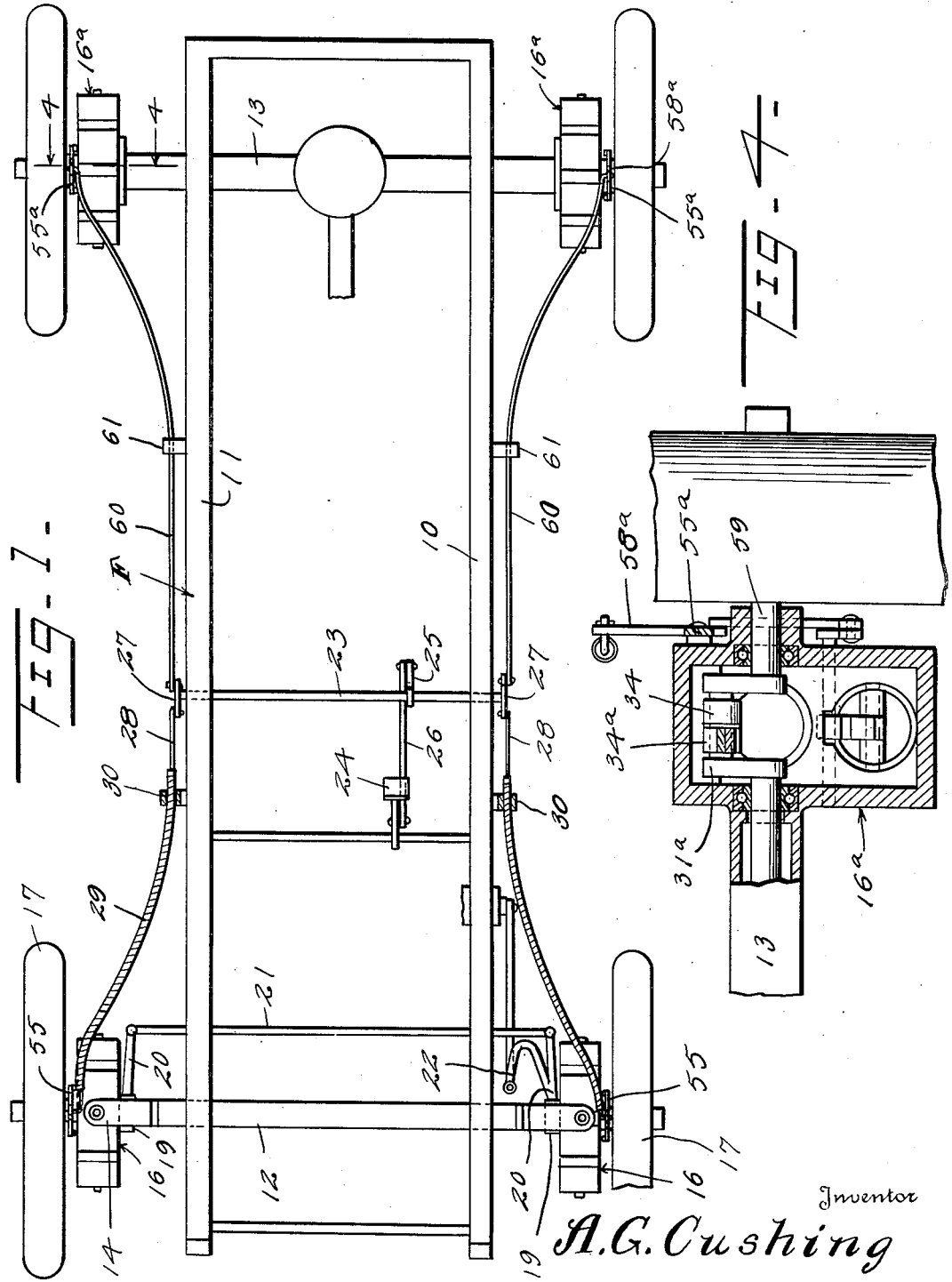
Inventor
A. G. Cushing
By Watson E. Coleman
Attorney Feb. 13, 1934.　　A. G. CUSHING　　1,946,486
VEHICLE BRAKE
Filed Nov. 26, 1932　　2 Sheets-Sheet 2
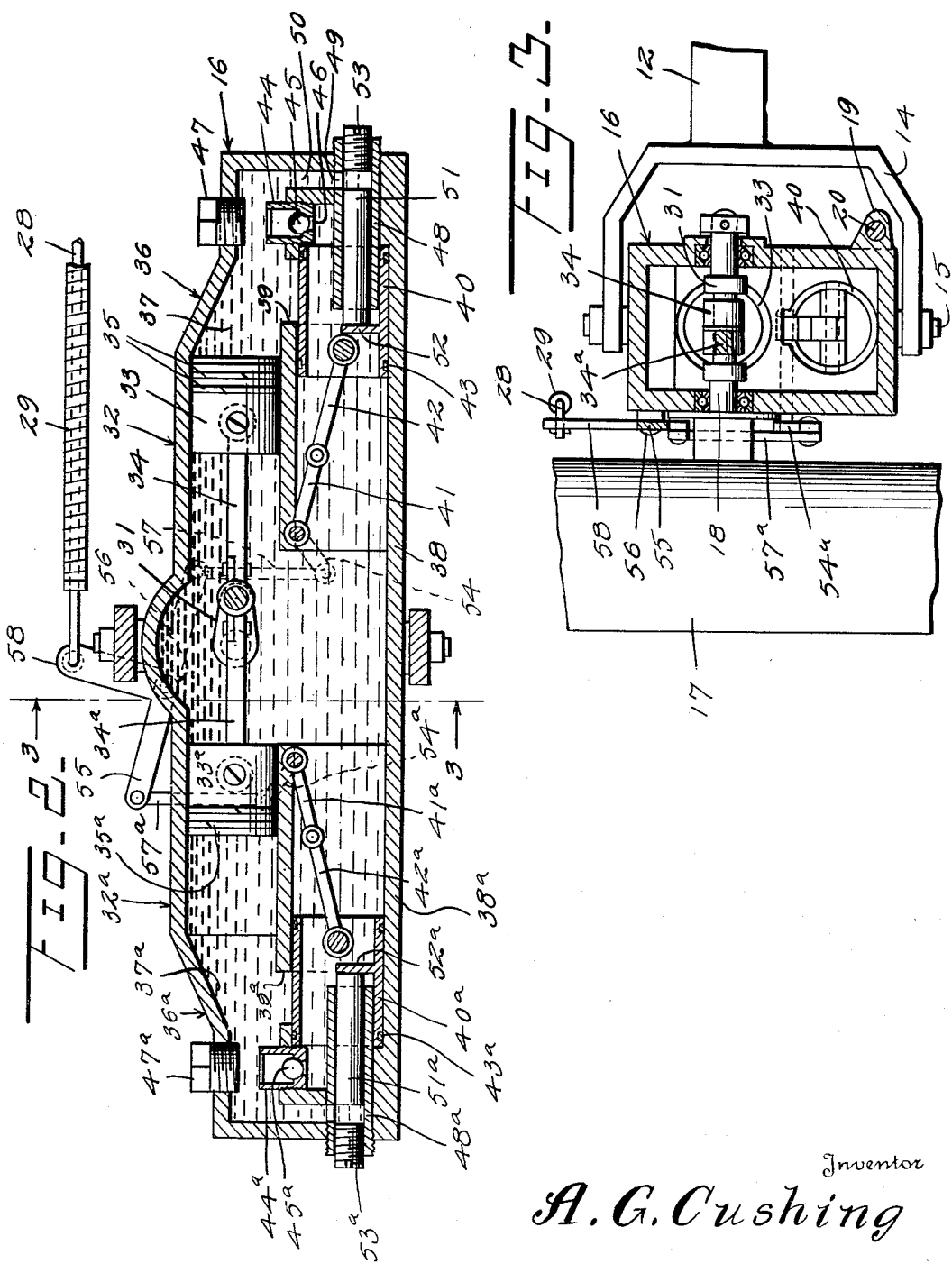
Inventor
A. G. Cushing
By Watson E. Coleman
Attorney Patented Feb. 13, 1934

1,946,486

UNITED STATES PATENT OFFICE 1,946,486

VEHICLE BRAKE

Adam G. Cushing, Vancouver, Wash.

Application November 26, 1932
Serial No. 644,501

7 Claims. (Cl. 188—99)

This invention relates to vehicle brakes and more particularly to a liquid braking means applicable to each wheel of the vehicle.

An object of this invention is to provide a liquid braking means in combination with an equalizer to equalize the control of each separate brake.

Another object is to provide in a braking means of this kind means whereby the operator of the brake will be prevented from locking the wheels where it is desired to bring the vehicle to a sudden stop.

A further object of this invention is to provide in a braking means of this kind means whereby the pressure of the brake is transmitted to the brake pedal so that the operator will feel the pressure applied to the braking means.

This invention is an improvement over the invention disclosed in my Patent No. 1,861,788, issued on June 7, 1932.

The above and various other objects and advantages of this invention will in part be described and in part be understood from the following detailed description of the present preferred embodiment, the same being illustrated in the accompanying drawings wherein:—

Figure 1 is a detail top plan view of a vehicle chassis partly broken away having a braking means constructed according to the preferred embodiment of this invention, mounted thereon.

Figure 2 is a longitudinal section taken substantially through the longitudinal center of the braking means mounted on a front wheel.

Figure 3 is a fragmentary sectional view partly in detail taken on the line 3—3 of Figure 2.

Figure 4 is a fragmentary sectional view taken on the line 4—4 of Figure 1.

Referring to the drawings wherein like characters of reference designate corresponding parts throughout the several views, the letter F designates generally the frame or chassis of a vehicle provided with parallel side bars 10 and 11, and a front axle 12. A rear axle housing 13 engages the rear ends of the side bars 10 and 11, and the front axle 12 is provided with forked opposite end portions, as at 14, and spindle studs 15 extend through the free ends of the forked portions 14, and a housing generally designated as 16 is swingably disposed between the opposed spindle studs 15.

A front wheel 17 is fixedly mounted on a spindle 18, which spindle 18 is rotatably carried by the horizontally swingable housing 16. A lug 19 is provided on the inner side of the housing 16 and a steering rod 20 is adapted to be engaged with the lug 19 so that the two front spindles can be secured together for unitary movement by means of a tie rod 21 or the like. Usual steering mechanism is adapted to be operatively engaged with a steering arm 22 carried by one of the housings 16.

A rock shaft 23 is carried by the side bars or frame members 10 and 11, and a brake pedal 24 is connected to a lever or arm 25 secured to the rock shaft 23 by means of a link connection 26. The opposite ends of the rock shaft 23 are provided with transversely extending opposed levers 27, and a brake rod 28 is connected at one end to one end of one of the levers 27, and the opposite end of the brake rod 28 is slidable within a flexible tubular member 29, which is fixedly secured at one end to a support 30 carried by the frame F at a point forwardly of the rock shaft 23.

In practice, there are two of these tubular members 29, one on each side of the frame F, and there are two housings 16. The spindle or shaft 18 is fixedly secured to the wheel 17, and is provided within the housing 16 with a crank or eccentric portion 31. The housing 16 has opposed cylinders 32 and 32a which are positioned one on each side of the crank 31, and a piston 33 is slidable in the cylinder 32 and the piston 33a is slidable in the cylinder 32a.

A pitman 34 is connected at one end to the eccentric or crank 31 and at the opposite end to the piston 33. A similar pitman 34a is connected at one end to the crank or eccentric 31 at one side of the connecting rod or pitman 34, and the opposite end of the pitman 34a is connected to the piston 33a. These pistons 33 and 33a are each provided with piston rings 35 and 35a of well known construction, so as to seal the walls of the pistons within the cylinder. The cylinder 32 is provided with a cylinder head 36, which head is provided with a pressure chamber 37.

A valve cylinder 38 is disposed at one side of the cylinder 32, and a port 39 provides communication between the pressure chamber 37, the cylinder 32 and the valve cylinder 38. A slidable valve 40 is mounted within the valve cylinder or chamber 38, and this valve 40 is cylindrical in construction and open at each end, the purpose for which will be hereinafter described.

A bell crank 41 is rockably carried by the housing 16 and this bell crank 41 is disposed within the valve chamber or cylinder 38. A connecting rod or pitman 42 is connected at one end to the bell crank 41 and at the other end to the slidable valve 40. This valve 40 is provided with sealing rings 43, one at each end of the valve so as to seal the valve within the cylinder 38. The cylinder 32a also has a pressure chamber 37a, a valve cylinder 38a disposed adjacent thereto and a port 39a connects the cylinder 32a with the cylinder 38a. A slidable valve 40a is positioned in the cylinder 38a and connected to a bell crank 41a, which is in turn connected to the valve 40a by means of a pitman or connecting rod 42a.

A tubular check valve housing 44 is mounted in the head 36 and one end of the tubular housing 44 communicates with the pressure chamber 37, while the other end communicates with the cylinder 38. A check valve 45 is adapted to engage a seat 46 and is positioned so that movement of the piston 33 inwardly will unseat the valve 45 and draw a liquid positioned within the head 37 and within the cylinder 38 back into the head 36 notwithstanding the fact that the valve 40 is moved into completely closed position. A plug 47 is threaded into the head 36 and is in substantial alinement with the check valve so that this valve may be removed for adjustment or the like.

An elongated cylindrical member 48 is mounted in the head 36, and this cylindrical or tubular member 48 is provided with a port 49 communicating with a passage 50, which opens into the pressure chamber 37. A plunger 51 is slidable in the cylindrical member 48 and the inner end of this plunger 51 is adapted to engage an upstanding lug 52 carried by the valve member 40. An adjusting plug 53 is threaded into the outer end of the pressure controlled cylinder 48, and this plug 53 may be moved inwardly to control the movement of liquid through the port 49 from the passage 50. The bell crank 41 extends outwardly of the housing 16, and is provided with a second crank portion 54. The bell crank 41a also has an extension or crank portion 54a on the exterior of the housing 16. A rock lever 55 is rockably mounted on a pin 56 secured to the housing 16 and one end of the rock lever 55 is connected as by a link 57 to the lever 54, while the other end of the lever 55 is connected as by a link 57a to the rock lever 54a.

A lug or lateral extension 58 is secured to the rock lever 55 intermediate the ends thereof, and this extension is connected to the opposite or forward end of the flexible cable 29. Through the use of the rock lever 55, both valves 40 and 40a may be moved into partially or completely closed position or into entirely open position at the same time, and the levers 54 and 54a are so positioned as to effect this simultaneous movement. In other words, the valves 40 and 40a are moved simultaneously into the same relative position.

A pair of rear housings 16a are positioned one on each side of the frame F, and are secured to the axle housing 13 adjacent the outer ends of the axle housing 13. The rear axle 59 is provided with an offset crank or eccentric portion 31a with which a braking means similar to that described for the front wheels is operatively engaged. A rod 60 is connected at one end to the other end of the lever 27, and the other end of the rod 60 is connected to an extension 58a carried by a rock lever 55a which is similar to the front lever 55. The housing 16a is provided with a pair of pistons similar to the pistons 33 and 33a and also with valves 40 and 40a which are operatively connected with each end of the lever 55a. As the rear braking members positioned in the housings 16a are similar to the front braking members in the housing 16, further description of these braking members is believed unnecessary. The rod 60 is slidable in a bearing 61 carried by the frame F between the rock shaft 23 and the rear housing 13.

In the use and operation of this device, when the brake pedal 24 is depressed, the valve members 40 and 40a are moved to closing position so as to close or partially close the ports 39 and 39a. By restricting these ports 39 and 39a, the passage of the liquid within the cylinder 32 and the pressure chamber 37 will be retarded, thereby acting to resist the movement of the pistons 33 and 33a. As the piston 33 moves outwardly, the valve 45 will be engaged with the valve seat 46, and as this piston 33 returns to its innermost position, the valve 45 will be drawn upwardly a slight distance to released position. In the event the valves 40 and 40a are moved into completely closed position by a sudden pressure on the pedal 24, the pressure in the pressure chamber 37 caused by outward movement of the piston 33 will be transmitted through the passage 50 and the port 49 to the plunger 51, thereby causing this plunger 51 to press against the lug 52 and urge the valve 40 into open or partially open position. It will, of course, be understood that the entire housing 16 is filled with the desired liquid which may be in the form of an oil having the desired viscosity so that the walls of the cylinders within the housing 16 will be suitably lubricated at all times.

It will be apparent from the foregoing that a liquid braking means has been disclosed wherein there are provided opposed cylinders with oppositely moving pistons therein, thereby providing a more equalized pressure on the wheel than where only a single piston is provided, and also facilitating the passage of the fluid in and out of the pressure chambers 37 and 37a.

This equalization of pressure is effected by reason of the fact that when one piston is on the pressure stroke, the other piston is on the return stroke so that there is a constant surge of the fluid forward and back in the housing 16. The same action takes place in each housing. The action of the plunger 51 is the same whether the associated valve is in either partially open or completely closed position. Through the use of this plunger 51, the pressure applied thereto by the liquid will be transmitted back through the associated valve and valve operating means to the brake pedal 24 so that the operator can determine by the feel of pressure on the pedal 24 the exact pressure which is applied to the various wheels.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A braking means comprising a crank shaft rotatable with a vehicle wheel, a housing about the shaft, opposed cylinders in the housing, pistons slidable in the cylinders, connecting rods connecting the pistons and the crank shaft, a liquid in the cylinders and housing, each of said cylinders having a port communicating with the housing, a valve for each port, valve operating means, and means engaging the valves resisting closing of the valves.

2. A braking means comprising a crank shaft rotatable with a vehicle wheel, a housing about the shaft, opposed cylinders in the housing, pistons connected to said shaft and slidable in the cylinders, a liquid in the cylinders and housing, a port establishing communication between each cylinder and the housing, a valve for each port, manually controlled valve operating means, and means engaging the valves resisting closing thereof.

3. A braking means comprising a crank shaft, a housing about the shaft, a cylinder in the housing, a piston slidable in the cylinder and connected to the crank shaft, a port establishing communication between the outer end of the cylinder and the housing, a liquid completely filling the housing and the cylinder, a valve for said port open at each end, valve operating means, and means active upon movement of the valve into closed or partly closed position resisting closing of the valve, said latter means engaging the interior of the valve and receiving pressure from the liquid in the housing.

4. A braking means comprising a rotatable crank shaft, a housing about the shaft, a cylinder in the housing, a piston slidable in the cylinder and connected to the shaft, a port establishing communication between the outer end of the cylinder and the housing, a liquid in the housing and the cylinder, a hollow valve, valve operating means, and means carried by the housing and active upon movement of the valve into closed position to resist closing thereof.

5. A braking means comprising a crank shaft, a housing about the shaft, opposed cylinders in the housing, a port for each cylinder establishing communication at the outer end of the cylinder with the housing, a liquid in each cylinder and the housing, a piston in each cylinder, means connecting each piston with the crank shaft, slidable valve members carried by the housing for movement across said port of each cylinder, valve operating means, and coacting means carried by the housing and the valves to resist closing of the valves.

6. A braking means comprising a crank shaft rotatable with a vehicle wheel, a housing about the shaft, opposed cylinders in the housing, pistons slidable in the cylinders, means connecting the pistons with the crank shaft, a liquid in the cylinders and the housing, a port establishing communication at the outer end of each cylinder with the housing, a tubular valve for each port open at each end, valve operating means, a lug carried by each valve, and means carried by the housing and operative upon movement of each valve toward closing position to resist closing of the valve.

7. A braking means comprising a crank shaft rotatable with a vehicle wheel, a housing about the shaft, opposed cylinders having a port at the outer end thereof communicating with the housing, pistons slidable in the cylinders, connecting means connecting the pistons with the crank shaft, a liquid in the cylinders and the housing, a check valve between each cylinder and the housing controlling movement of the liquid in one direction to prevent complete exhaustion of the liquid in the cylinders, a slidable valve for each port, valve operating means for each valve, a pair of reduced cylinders within the housing and having an opening directed toward each valve, a passage establishing communication between the first named cylinders and the reduced cylinders, a lug carried by each valve, and a plunger slidable in each reduced cylinder for engagement with the lug of the valve to resist movement of the valve into closing position.

ADAM G. CUSHING.